(12) United States Patent
Sugiura et al.

(10) Patent No.: US 9,094,233 B2
(45) Date of Patent: Jul. 28, 2015

(54) COMMUNICATION SYSTEM

(71) Applicant: DENSO CORPORATION, Kariya, Aichi-pref. (JP)

(72) Inventors: Yoshie Sugiura, Nagoya (JP); Yuukou Murase, Nagoya (JP); Hirokazu Ooyabu, Nagoya (JP); Fan Wang, Nagoya (JP); Akira Takaoka, Okazaki (JP)

(73) Assignee: DENSO CORPORATION, Kariya (JP)

( * ) Notice: Subject to any disclaimer, the term of this patent is extended or adjusted under 35 U.S.C. 154(b) by 93 days.

(21) Appl. No.: 14/070,729

(22) Filed: Nov. 4, 2013

(65) Prior Publication Data

US 2014/0133496 A1    May 15, 2014

(30) Foreign Application Priority Data

Nov. 9, 2012   (JP) ................. 2012-247470

(51) Int. Cl.
*H04L 12/413* (2006.01)
*H04L 12/40* (2006.01)

(52) U.S. Cl.
CPC ........ *H04L 12/413* (2013.01); *H04L 12/40045* (2013.01)

(58) Field of Classification Search
CPC .................................................. H04L 12/413
USPC .................................................. 370/445, 447
See application file for complete search history.

(56) References Cited

U.S. PATENT DOCUMENTS

| 5,982,781 | A | | 11/1999 | Przybyla | |
|---|---|---|---|---|---|
| 6,005,475 | A | * | 12/1999 | Takasan et al. | ............... 375/258 |
| 8,373,546 | B2 | * | 2/2013 | Nagasawa | ................. 340/12.22 |

FOREIGN PATENT DOCUMENTS

| JP | 2002-033754 A | 1/2002 |
|---|---|---|
| JP | 2005-045327 A | 2/2005 |

* cited by examiner

*Primary Examiner* — Samina Choudhry
(74) *Attorney, Agent, or Firm* — Posz Law Group, PLC

(57) ABSTRACT

In a communication system, nodes are coupled to a transmission path in a bus topology. The nodes communicate with each other via the transmission path using communication signals that have a communication frequency and are synchronized with a power supply signal. Each of the nodes includes a coupling portion that transmits and receives the communication signal and the power supply signal using electromagnetic induction in non-contact with the transmission path. Each of the nodes determines whether a collision of the communication signals occurs on the transmission path based on a voltage level of a signal that has the communication frequency and is induced at the coupling portion.

5 Claims, 7 Drawing Sheets

COMMUNICATION SYSTEM

CROSS REFERENCE TO RELATED APPLICATIONS

The present application is based on and claims priority to Japanese Patent Application No. 2012-247470 filed on Nov. 9, 2012, the contents of which are incorporated in their entirety herein by reference.

TECHNICAL FIELD

The present disclosure relates to a communication system that includes a plurality of nodes coupled to a transmission path in a non-contact manner.

BACKGROUND

A conventional communication system achieve communication between movable bodies (slave nodes) and a control device (master node), which controls movement of the movable bodies, via a power supply line for supplying power to the movable bodies in a non-contact manner.

Specifically, a communication signal is superimposed on an alternating-current power supply signal, and the communication signal is input and output via communication antenna coils disposed in the movable bodies. Signals transmitted from respective movable bodies and signals received by respective movable bodies have different frequencies. Thus, communication between the movable bodies is achieved via a relay process by the control device that receives a signal and transmits the signal with changing frequency (see, for example, JP-A-H10-84303 corresponding to U.S. Pat. No. 6,005,475A).

In the above-described communication system, the slave nodes cannot directly communicate with each other. Thus, the communication system has a low responsivity and is unsuitable to event directional communication. In addition, the master node needs to manage address information and the like of all the slave nodes for the relay process. When a slave node is additionally coupled, the master node needs to be reconfigured. Therefore, a system configuration cannot be changed easily.

When a multi-master method in which nodes can directly communicate with each other without via a master node is applied to a communication system in which nodes are coupled to a transmission path in a non-contact manner, the following issues are caused.

In the multi-master method, a transmission signal and a reception signal on the transmission path needs to have the same frequency, and signals transmitted from the respective nodes may collide on the transmission path. Thus, the collision needs to be detected.

As a method of detecting the collision, a carrier sense multiple access with collision detection (CSMA/CD) method and a carrier sense multiple access with collision avoidance (CSMA/CA) method are known. In the CSMA/CD method and the CSMA/CA method, each node directly detects a level of a signal on the transmission path and detects a collision based on determination of whether a signal transmitted from the node corresponds to the signal on the transmission path.

However, the node coupled to the transmission path in the non-contact manner cannot directly detect the level of the signal on the transmission path. Thus, the conventional method cannot be applied simply.

SUMMARY

It is an object of the present disclosure to provide a communication system in which nodes coupled to a transmission path in a non-contact manner can detect a collision of communication signals on the transmission path.

A communication system according to an aspect of the present disclosure includes a transmission path, a plurality of nodes, and a power supplying portion. The nodes are coupled to the transmission path in a bus topology. The nodes communicate with each other via the transmission path using communication signals having a predetermined communication frequency. The power supplying portion supplies a power supply signal having a predetermined power supply frequency to the transmission path.

Each of the nodes includes a coupling portion, a synchronizing signal generation portion, a bus state determination portion, a transmission portion, a collision determination portion, and a transmission stopping portion. The coupling portion transmits and receives the power supply signal and the communication signal using electromagnetic induction in non-contact with the transmission path. The synchronizing signal generation portion generates a synchronizing signal that has the communication frequency and is synchronized with the power supply signal based on the power supply signal received via the coupling portion. The bus state determination portion determines whether the transmission path is in an idle state in which the communication signal does not exist on the transmission path based on a voltage level of a signal that has the communication frequency and is induced at the coupling portion. The transmission portion transmits the communication signal via the coupling portion when the bus state determination portion determines that the transmission path is in the idle state. The communication signal includes a header part and a data part. The header part includes the synchronizing signal without modulation. The data part includes a signal obtained by modulating the synchronizing signal with a transmission data to other node in the nodes. The collision determination portion determines whether a collision of the communication signals occurs on the transmission path based on the voltage level of the signal that has the communication frequency and is induced at the coupling portion. The transmission stopping portion stops transmission of the data part by the transmission portion when the collision determination portion determines that the collision occurs during transmission of the header part.

In the communication system, each of the nodes transmits the communication signal synchronized with the power supply signal. Thus, the voltage level of the signal that has the communication frequency and is induced at the coupling portion changes between a case where single node transmits the communication signal and a case where multiple nodes transmit the communication signal at the same time. Therefore, each of the nodes can determine whether a collision of the communication signal occurs on the transmission path based on the voltage level of the signal that has the communication frequency and is induced at the coupling portion.

BRIEF DESCRIPTION OF THE DRAWINGS

Additional objects and advantages of the present disclosure will be more readily apparent from the following detailed description when taken together with the accompanying drawings. In the drawings.

DETAILED DESCRIPTION

Figure 8A:
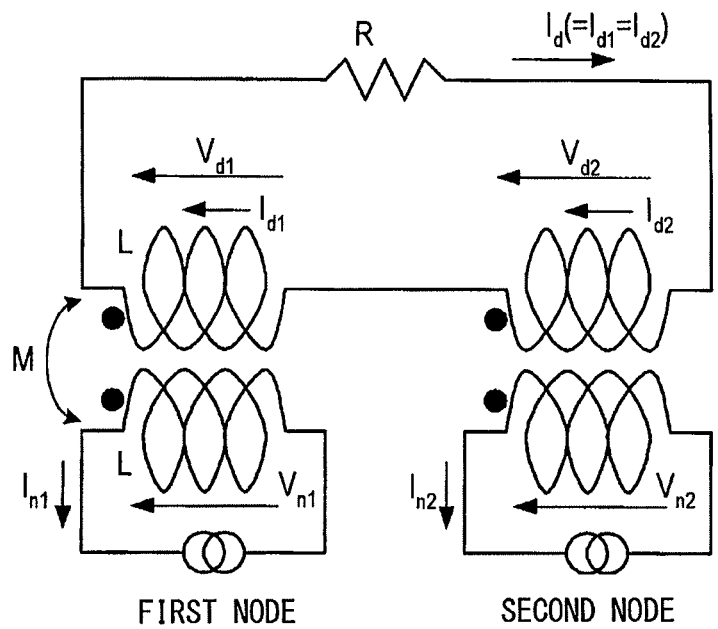
FIG. 8A is an equivalent circuit diagram for explaining a principle of the present disclosure.

Before describing exemplary embodiments of the present disclosure, a principle that a voltage across a coupling portion changes depending on the presence or absence of collision will be described. FIG. 8A is an equivalent circuit diagram showing a configuration of a transmission path, coupling portions, and nodes. The transmission path is coupled with a first node and a second node.

Each inductance of a transmission-path side inductor and a node side inductor in the coupling portion is expressed as L. An interaction inductance of both inductors is expressed as M. The nodes are identified by an identifier (i=1, 2). An electric current that flows in the transmission-path side inductor of the node i is expressed as Idi, and a voltage across the transmission-path side inductor is expressed as Vdi. An electric current that flows in the node side inductor is expressed as Ini, and a voltage across the node side inductor is expressed as Vni.

In this case, the above-described parameters satisfy relationships of Expressions (1), (2).

$$V_{di} = L\frac{dI_{di}}{dt} + M\frac{dI_{ni}}{dt} \qquad (1)$$

$$V_{ni} = L\frac{dI_{ni}}{dt} + M\frac{dI_{di}}{dt} \qquad (2)$$

Because the transmission-path side inductors are coupled in series, Expression (3) is satisfied. When an impedance of the transmission path is expressed as R, Expression (4) is satisfied.

$$I_d = I_{d1} = I_{d2} \qquad (3)$$

$$V_{d1} + V_{d2} = I_d \cdot R \qquad (4)$$

When a coupling coefficient of the transmission-path side inductor and the node side inductor is assumed to be 1, the self inductance L and the interaction inductance M satisfy a relationship of Expression (5). In addition, when electric current I is expressed as Expression (6), a relationship of Expression (7) is satisfied.

$$M = \sqrt{L \cdot L} = L \qquad (5)$$

$$I = I_0 e^{j(\omega i + \phi)} \qquad (6)$$

$$\frac{dI}{dt} = j\omega I \qquad (7)$$

Firstly, a case where the nodes transmit signals by current drive will be described. When the two nodes transmit current signals of the same phase at the same time, a collision occurs on the transmission path. In this case, when Expression (4) is modified using Expressions (1), (2) on ground that Expression (8) is satisfied, Expression (9) is obtained.

$$I_{n1} = I_{n2} \neq 0 \qquad (8)$$

$$2L\frac{dI_d}{dt} + 2M\frac{dI_{ni}}{dt} - I_d \cdot R = 0 \qquad (9)$$

Furthermore, when Expression (9) is modified using the relationship of Expression (5) and using the relationship of Expression (7) with respect to Id, Expression (10) is obtained. In addition, when Expression (10) is solved by the electric current id flowing in the transmission path and is substituted into Expression (2), Expression (11) is obtained.

$$\left(\frac{R}{2L} - j\omega\right)I_d = \frac{dI_{ni}}{dt} \qquad (10)$$

$$V_{ni}(=V_{ng}) = L\frac{R}{R - 2j\omega L} \cdot \frac{dI_{ni}}{dt} \qquad (11)$$

On the other hand, when one of the nodes transmits a current signal and the other node does not transmit a current signal, a collision does not occur in the transmission path. In this case, when Expression (4) is modified using Expressions (1), (2) on ground that Expression (12) is satisfied, Expression (13) is obtained.

$$I_{n1} \neq 0, \quad I_{n2} = 0 \qquad (12)$$

$$2L\frac{dI_d}{dt} + M\frac{dI_{ni}}{dt} - I_d \cdot R = 0 \qquad (13)$$

Furthermore, when Expression (13) is modified using the relationship of Expression (5) and using the relationship of Expression (7) with respect to Id, Expression (14) is obtained. In addition, when Expression (14) is solved by the electric current Id flowing in the transmission path and is substituted into Expression (2), Expression (15) is obtained.

$$\left(\frac{R}{L} - 2j\omega\right)I_d = \frac{dI_{ni}}{dt} \qquad (14)$$

$$V_{ni}(=V_{ok}) = L\frac{R - j\omega L}{R - 2j\omega L} \cdot \frac{dI_{ni}}{dt} \qquad (15)$$

A voltage Vni across the node side inductor detected in a case where a collision occurs is expressed as Vng, and a voltage Vni across the node side inductor detected in a case where collision does not occur is expressed as Vok. A ratio of the voltages Vng and Vok is expressed by Expression (16), and the absolute value of the ratio is expressed by Expression (17).

$$\frac{V_{ng}}{V_{ok}} = \frac{R}{R - j\omega L} \qquad (16)$$

$$\left|\frac{V_{ng}}{V_{ok}}\right| = \left|\frac{R}{R - j\omega L}\right| = \frac{R}{\sqrt{R^2 + (\omega L)^2}} < 1 \qquad (17)$$

Because L>0, ω>0, the voltage Vng is not equal to the voltage Vok and the absolute values of the voltages Vng and Vok always satisfy a relationship of |Vng|<|Vok|, the voltages can be identified. Thus, the presence or absence of collision can be determined based on the voltage across the node side inductor.

Figure 8B:
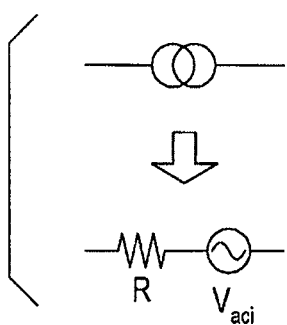
FIG. 8B is a diagram showing a replacement of a current source by a voltage source and a resistor.

Next, a case where the nodes transmit signals by voltage drive will be described. In a case of the voltage drive, a current source shown in FIG. 8A is replaced by a voltage source and a resistor shown in FIG. 8B.

When a voltage generated by the voltage source is expressed as Vaci and a resistance value is set to R same as the impedance of the transmission path, Expression (18) is satisfied. When the Expression (18) is applied to the relationship of Expression (7), Expression (19) is obtained. Furthermore, when Expression (19) is substituted into Expression (11), Expression (20) that expresses the voltage Vng across the inductor detected in a case where a collision occurs can be obtained. In addition, when Expression (19) is substituted into Expression (15), Expression (21) that expresses the voltage Vok across the inductor detected in a case where a collision does not occur can be obtained.

$$V_{ni} = V_{nci} - I_{ni} \cdot R \qquad (18)$$

$$\frac{dI_{ni}}{dt} = j\omega I_{ni} = j\omega \frac{V_{aci} - V_{ni}}{R} \qquad (19)$$

$$V_{ng} = \frac{j\omega L}{R - j\omega L} V_{aci} \qquad (20)$$

$$V_{ok} = \frac{j\omega L(R - j\omega L)}{R^2 - j\omega RL - (j\omega L)^2} V_{aci} \qquad (21)$$

The ratio of the voltages Vng and Vok is expressed by Expression (22) and the absolute value of the ratio is expressed by Expression (23).

$$\frac{V_{ng}}{V_{ok}} = \frac{R^2 + (\omega L)^2 - j\omega RL}{R^2 - (\omega L)^2 - 2j\omega RL} \qquad (22)$$

$$\left|\frac{V_{ng}}{V_{ok}}\right| = \frac{\sqrt{R^4 + (\omega L)^4 + 3(\omega RL)^2}}{\sqrt{R^4 + (\omega L)^4 + 2(\omega RL)^2}} < 1 \qquad (23)$$

Because L>0, ω>0, the voltage Vng is not equal to the voltage Vok and the absolute values of the voltages Vng and Vok always satisfy a relationship of |Vng|<|Vok|, the voltages can be identified. Thus, the presence or absence of collision can be determined based on the voltage across the node side inductor. Thus, also in the case of voltage drive, the presence or absence of collision can be determined by monitoring the voltage across the node side inductor in a manner similar to the case of current drive.

Exemplary embodiments of the present disclosure will be described below with reference to the drawings.

(First Embodiment)

Figure 1:
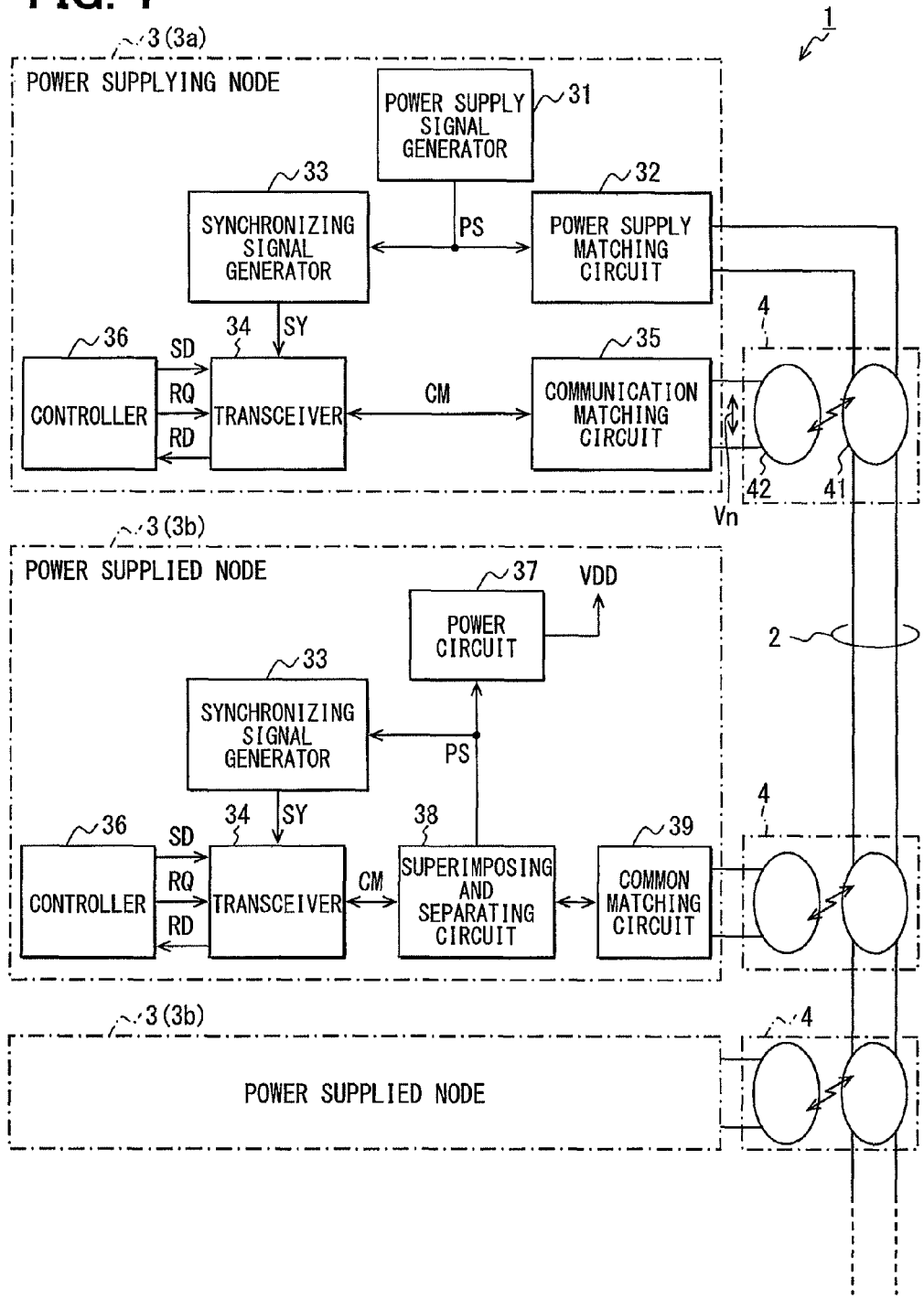
FIG. 1 is a block diagram showing a communication system according a first embodiment of the present disclosure.

As shown in FIG. 1, a communication system 1 according to a first embodiment includes a transmission path 2 and a plurality of nodes 3 coupled to the transmission path 2 in a bus topology. The transmission path 2 is formed of a twisted pair wire. The nodes 3 communicate with each other via the transmission path 2.

The nodes 3 include a power supplying node 3a and power supplied nodes 3b. The power supplying node 3a is directly connected with the transmission path 2 and supplies electric power to the other nodes 3. The power supplied nodes 3 are coupled to the transmission path 2 via coupling portions in a non-contact manner. The power supplied nodes 3 operate by receiving electric power via the transmission path 2.

The power supply via the transmission path 2 uses a power supply signal PS having a predetermined frequency (hereafter, referred to as a power supply frequency). Communication via the transmission path 2 uses a communication signal CM. The communication signal CM has a frequency (hereafter, referred to as a communication frequency) different from the power supply frequency.

The communication signal CM includes a header part and a data part. The header part includes a non-modulated signal used for collision detection. The data part includes a signal that is treated with a phase shift keying (PSK) modulation.

The coupling portion 4 includes a transmission-path side coupling portion 41 and a node side coupling portion 42. The transmission-path side coupling portion 41 and the node side coupling portion 42 are capable of transmitting and receiving signals having the power supply frequency and signals having the communication frequency using electromagnetic induction.

The transmission-path side coupling portion 41 includes a ring-shaped portion. The ring-shaped portion is formed by loosening a part of twists of the twisted pair wire forming the transmission path 2 and functions as an inductor. The node side coupling portion 42 is formed of an inductor having a spiral shape and disposed opposite to the ring-shaped portion of the transmission-path side coupling portion 41.

The power supplying node 3a includes a power supply signal generator 31, a power supply matching circuit 32, and a synchronizing signal generator 33. The power supply signal generator 31 generates a power supply signal PS. An output impedance of the power supply matching circuit 32 to the transmission path 2 is set such that the power supply signal PS generated by the power supply signal generator 31 (i.e., a signal of the power supply frequency) can be transmitted in the transmitted with high frequency. The synchronizing signal generator 33 generates a synchronizing signal SY based on the power supply signal generated by the power supply signal generator 31. The synchronizing signal SY is synchronized with the power supply signal PS and has the same frequency as the communication frequency.

The synchronizing signal generator 33 may be a known phase synchronizing circuit that synchronizes an output of a voltage controlled oscillator (VCO) (e.g., the synchronizing signal SY) with a reference signal (e.g., the power supply signal PS) by feeding back a control signal that corresponds to a phase difference between the output of the VCO and the reference signal to an input of the VCO.

The power supplying node 3a further includes a transceiver 34, a communication matching circuit 35, and a controller 36. The transceiver 34 uses the synchronizing signal SY as a carrier wave and modulates the synchronizing signal SY with a transmission data SD in accordance with a transmission request RQ to generate the communication signal CM. In addition, the transceiver 34 generates a reception data RD by demodulating a signal of the communication frequency received from the transmission path 2. The communication matching circuit 35 is formed of, for example, a capacitor. With the inductor of the node side coupling portion 42, the communication matching circuit 35 form a resonance circuit that resonate at the communication frequency. The controller 36 generates the transmission data SD and the transmission request RQ supplied to the transceiver 34. In addition, the controller 36 performs processes in accordance with contents of the reception data RD supplied from the transceiver 34.

The power supplied node 3 includes a synchronizing signal generator 33, a transceiver 34, a controller 36, a power circuit 37, a superimposing and separating circuit 38, and a common matching circuit 39.

Both in the power supplying node 3a and the power supplied node 3b, the transceiver 34 generates the communication signal CM based on the synchronizing signal SY synchronized with the power supply signal PS. Thus, the communication signals CM output from the respective nodes 3 to the transmission path 2 are synchronized with each other. In other words, when the nodes 3 transmit non-modulated signals at the same time, the non-modulated signals have the same phase.

The superimposing and separating circuit 38 is disposed between the transceiver 34 and the common matching circuit 39. The superimposing and separating circuit 38 supplies the communication signal CM generated by the transceiver 34 to the common matching circuit 39. In addition, the superimposing and separating circuit 38 separates the communication signal CM and the power supply signal PS from the signal received from the transmission path 2 via the common matching circuit 39, and supplies the communication signal CM to the transceiver 34 and supplies the power signal PS to the power circuit 37 and the synchronizing signal generator 33.

The power circuit 37 rectifies and smoothes the power supply signal PS supplied from the superimposing and separating circuit 38 and generates a power output having a constant voltage VDD for driving each part of the power supplied node 3b. The common matching circuit 39 is formed of, for example, a capacitor. With the inductor of the node side coupling portion 42, the common matching circuit 39 form a resonance circuit that resonate at the power supply frequency.

The communication frequency is set based on frequency characteristics of the resonance circuit formed by the node side coupling portion 42 and the common matching circuit 39 so as to achieve transmission efficiency greater than or equal to a predetermined lower limit. The lower limit of the transmission efficiency is set such that a signal intensity of the communication signal CM received from the transmission path 2 via the coupling portion 4 is large enough to decode the signal with an error rate less than or equal to an allowable lower limit.

When an inductance of the inductor of the transmission-path side coupling portion 41 is expressed as L, a voltage across the inductor of the transmission-path side coupling portion 41 is expressed as Vd, an inductance of the inductor of the node side coupling portion 42 is expressed as L, a voltage across the inductor of the node side coupling portion 42 is expressed as Vn, and an impedance of the transmission path 2 and an output impedance of the transceiver 34 are expressed as R, these parameters are set such that the ratio calculated by Expression (23) can be the minimum value. In the present embodiment, the transceiver 34 transmits a signal by voltage drive.

If the above-described condition is satisfied, when the voltage Vn induced in a case where one of the nodes 3 independently outputs the communication signal CM is expressed as Vok and the voltage induced in a case where the multiple nodes 3 output the communication signals having the same phase at the same time is expressed as Vng, the voltages Vok and Vng have a relationship of Expression (24). In other words, in a case where a collision does not occur, large amplitude is detected compared with a case where a collision occurs.

$$|V_{ng}| < |V_{ok}| \tag{24}$$

Figure 2:
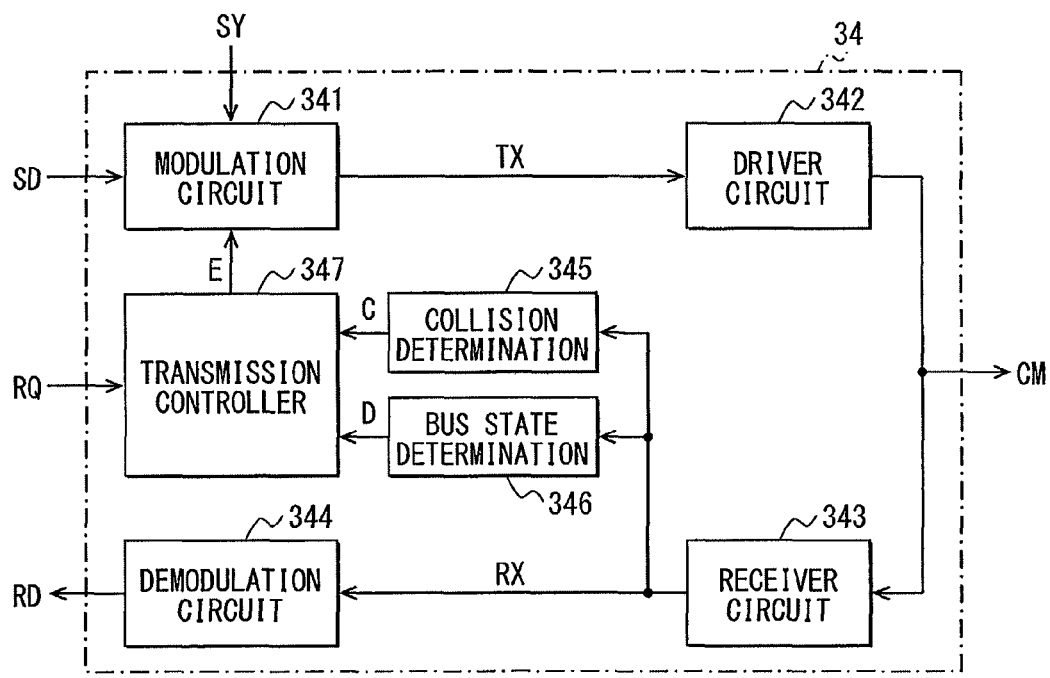
FIG. 2 is a block diagram showing a transceiver according to the first embodiment.

As shown in FIG. 2, the transceiver 34 includes a modulation circuit 341. The modulation circuit 341 performs modulation (PSK modulation) of the synchronizing signal SY with the transmission data SD expressed with binary code. A signal TX generated by the modulation circuit 341 is transmitted as the communication signal CM via a driver circuit 342.

The transceiver 34 further includes a demodulation circuit 344. The demodulation circuit 344 demodulates a reception signal RX (i.e., the communication signal CM) received via a receiver circuit 343 and generates the reception data RD. In the following description, it is assumed that a signal level of the reception signal EX is equal to the voltage Vn across the inductor of the node side coupling portion 42.

The transceiver 34 further includes a collision determination portion 345, a bus state determination portion 346, and a transmission controller 347. The collision determination portion 345 transmits a collision detection signal C that transitions to an active level when the signal level Vn of the reception signal RX is greater than a predetermined collision determination threshold value VTa (Vok<VTa<Vng). The bus state determination portion 346 transmits an idle detection signal D that transitions to an active level when a state where the signal level of the reception signal RX is less than a predetermined idle detection threshold value VTb (noise level<VTb<<Vok) continues for a period longer than or equal to a predetermined period. The transmission controller 347 generates a transmission enabling signal E that controls an operation state of the modulation circuit 341 (and then controls availability of the communication signal CM) based on the transmission request RQ from the controller 36, the collision detection signal C from the collision determination portion 345, and the idle detection signal D from the bus state determination portion 346.

Figure 3:
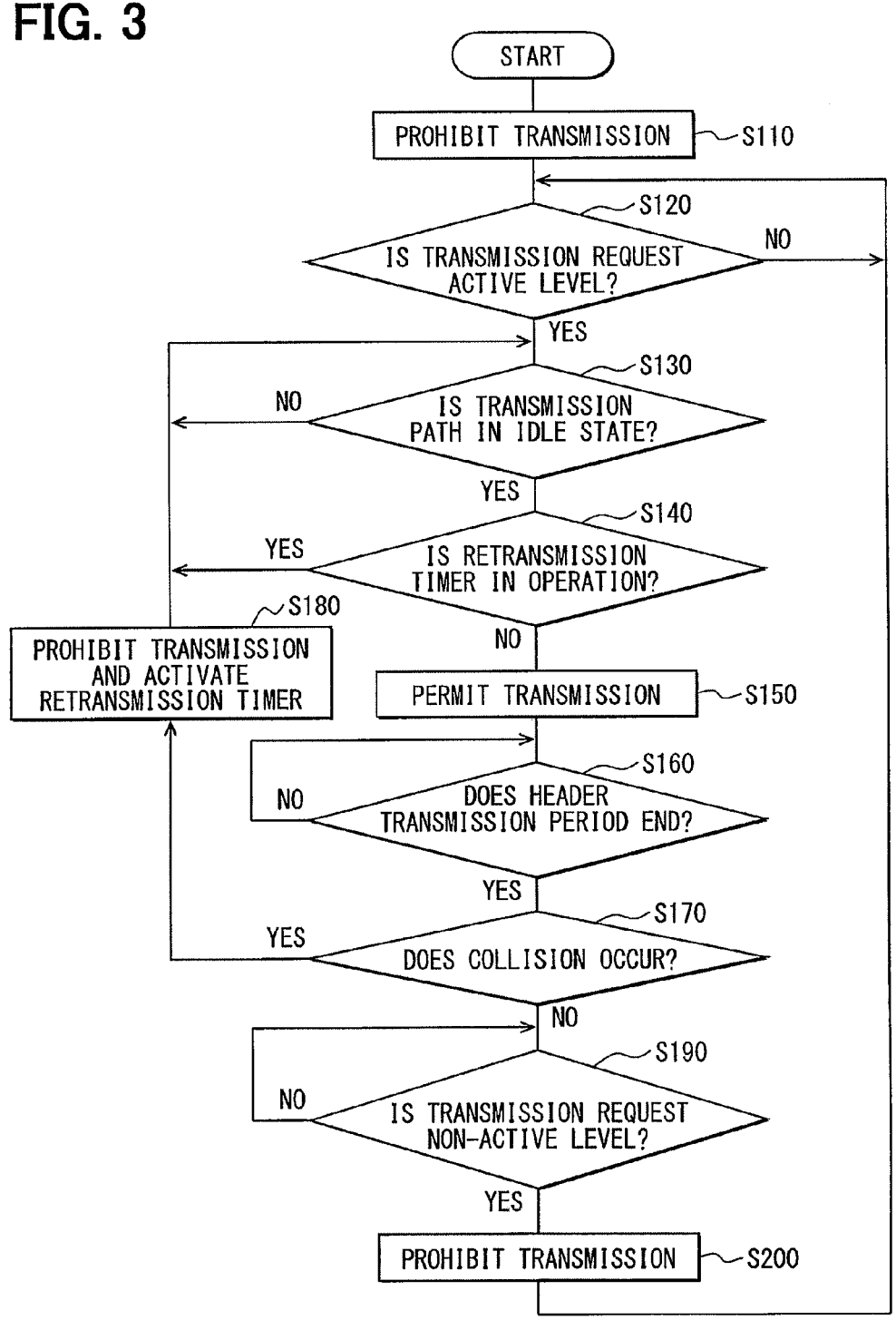
FIG. 3 is a flowchart showing a transmission control process performed by a transmission controller in the transceiver.

A process performed by the transmission controller 347 will be described with reference to FIG. 3. The transmission controller 347 includes a timer for counting time. In the present embodiment, the transmission controller 347 uses the timer as a retransmission timer. The transmission controller 347 is realized by a combination of logic circuits. The transmission controller 347 is activated when power supply to the transceiver 34 starts.

When the transmission controller 347 is activated, the transmission controller 347 initially sets the transmission enabling signal E to a non-active level to prohibit the operation of the modulation circuit 341 and transmission of the communication signal CM (S110).

Then, the transmission controller 347 waits until the transmission request RQ transitions to an active level (S120). When the transmission request RQ transition to the active level, the transmission controller 347 determines whether the idle detection signal D is at an active level, that is, whether the transmission path 2 is in an idle state (S130).

When the idle detection signal D is at a non-active level, the transmission controller 347 waits until the idle detection signal D transitions to the active level. When the idle detection signal D is at the active level, the transmission controller 347 determines whether the retransmission timer is in operation (S140).

When the retransmission timer is in operation, the transmission controller 347 waits until the retransmission timer stops (time out). When the retransmission timer stops, the transmission controller 347 sets the transmission enabling signal E to the active level to permit the operation of modulation circuit 341 (i.e., generation of the transmission signal TX) and the transmission of the communication signal CM.

Then, the transmission controller 347 waits until a header transmission period required for transmitting the header part of the communication signal ends (S160). When the header transmission period ends, the transmission controller 347 determines whether the collision detection signal C is an active level, that is, whether a collision of the communication signals CM occurs on the transmission path 2 (S170).

When the collision detection signal C is at the active level, the transmission controller 347 immediately sets the transmission enabling signal E to the non-active level to prohibit the transmission of the communication signal CM, activate the retransmission timer (S180), and returns to S130. Each time the retransmission timer is activated, a time to time out of the retransmission timer is set in a random manner within a predetermined time range.

On the other hand, when the collision detection signal C is at the non-active level, the transmission controller 347 waits until the transmission request RQ transitions to the non-active level, that is, until the transmission of the communication signal CM ends (S190). When the transmission request RQ transitions to the non-active level, the transmission controller 347 sets he transmission enabling signal E to the non-active level to prohibit the transmission of the communication signal CM and returns to S120.

Figure 4A:
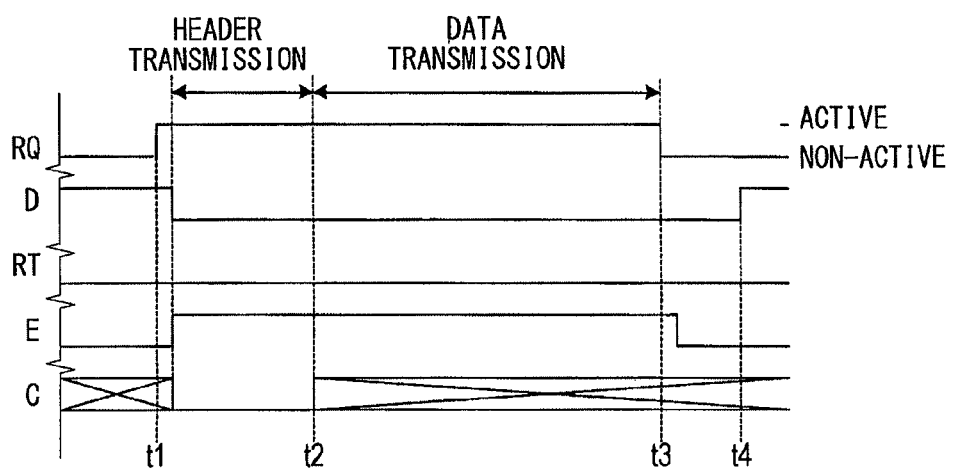
FIG. 4A is a timing diagram showing an operation example of the transceiver and FIG. 4B is a timing diagram showing another operation example of the transceiver.

In the communication system 1, as shown in FIG. 4A, if the idle detection signal D is at the active level and the retransmission timer is not in operation at a time point (time point t1) when the transmission request RQ transitions to the active level, the transmission enabling signal E transitions to the active level and the transmission of the header part of the communication signal CM starts.

If the collision detection signal C is kept at the non-active level (i.e., the collision does not occur) during the transmission period of the header part, the transmission of the data part starts following the header part (time point t2). When the transmission of the data part ends (time point t3), the transmission request RQ transitions to the non-active level, and the transmission enabling signal E transitions to the non-active level. Then, if any of the nodes 3 does not transmit the communication signal CM during a predetermined period, the idle detection signal D transitions to the non-active level (time point t4).

Figure 4B:
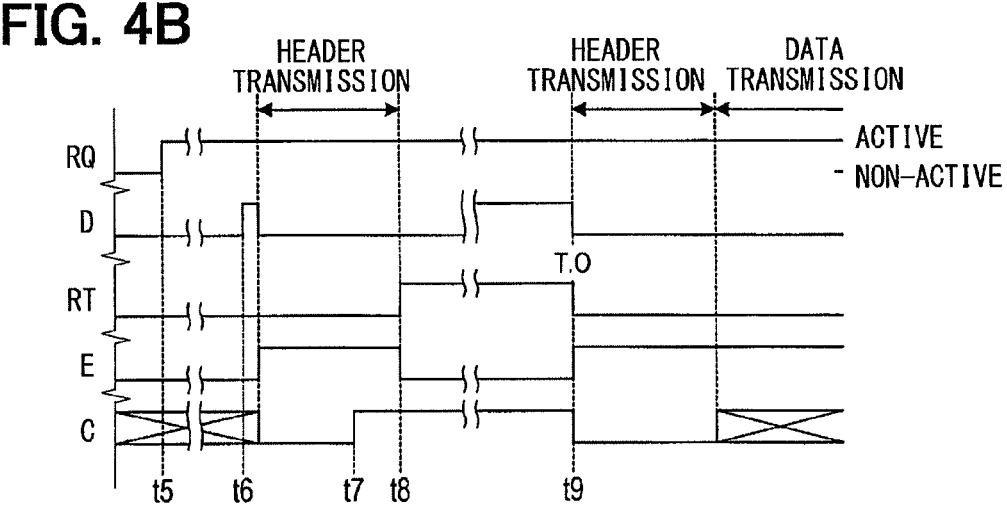

As shown in FIG. 4B, if the idle detection signal D is at the non-active level at a time point (time point t5) when the transmission request RQ transitions to the active level, even if the retransmission timer stops, the transmission enabling signal E is kept at the non-active level, and the transmission of the communication signal CM does not start. If the idle detection signal D transitions to the active level (time point t6), the transmission enabling signal E transitions to the active level, and the transmission of the header part of the communication signal CM starts.

If the collision detection signal transitions to the active level in the transmission period of the header part (time point t7), the transmission enabling signal E transitions to the non-active level when the transmission period of the header part ends (time point t8), and the transmission of the communication signal CM (data part) is stopped. Because the retransmission timer operates concurrently, the transmission enabling signal E is kept at the non-active level at least until the retransmission timer times out.

If the idle detection signal D is at the active level when the retransmission timer times out (time point t9), the transmission enabling signal E immediately transitions to the active level and the retransmission of the communication signal CM starts.

If the idle detection signal D is at the non-active level when the retransmission timer times out (not shown), the retransmission starts when the idle detection signal D transitions to the active level.

Figure 5:
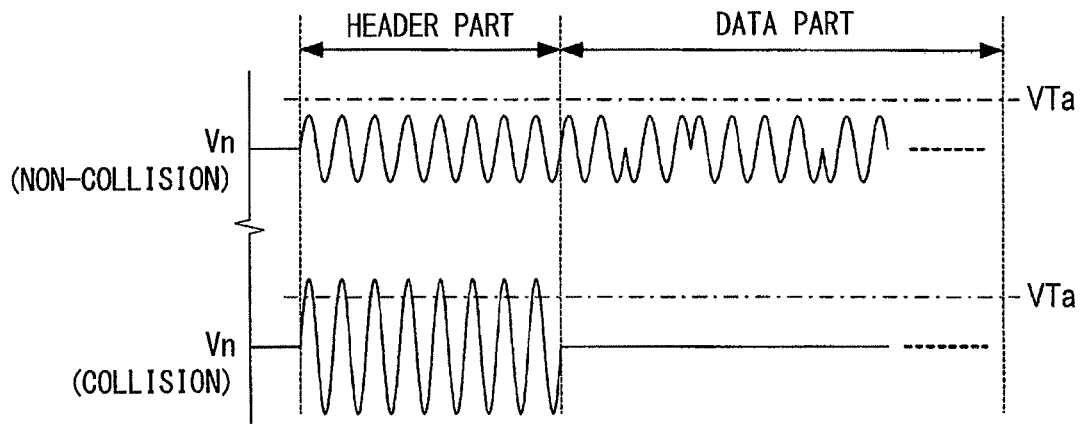
FIG. 5 is a diagram showing waveforms of a voltage across an inductor in a node side coupling portion in the communication system according to the first embodiment.

FIG. 5 is a diagram showing the signal levels of the reception signal RX (i.e., waveforms of the voltage Vn across the inductor) detected when the node 3 transmits the communication signal CM in a case where a collision occurs on the transmission path 2 and a case where a collision does not occur on the transmission path 2.

In a case where a collision does not occur, the voltage Vn detected in the transmission period of the header part is less than the collision determination threshold value, and the collision detection signal C at a time point when the transmission of the header part ends is at the non-active level. Thus, the transmission of the data part is performed.

In a case where a collision occurs, the voltage Vn detected in the transmission period of the header part is greater than or equal to the collision determination threshold value, and the collision detection signal C at a time point when the transmission of the header part ends is at the active level. Thus, the transmission of the data part is prohibited.

In the communication system 1 according to the present embodiment, each of the nodes 3 transmits the communication signal CM in accordance with the synchronizing signal SY generated from the power supply signal PS that is supplied in common. Accordingly, the voltage Vn across the inductor and the signal level of the reception signal RX change between a case where a collision of the communication signals CM occurs on the transmission path 2 and a case where a collision of the communication signals CM does not occur on the transmission path 2. Thus, by monitoring the signal level of the reception signal RX, the presence or absence of the transmission path 2 can be determined without detecting the signal level on the transmission path 2.

According to the communication system 1, a protocol allowing a collision can be adopted although the nodes 3 are in non-contact with the transmission path 2.

(Second Embodiment)

Next, a communication system 1 according to a second embodiment of the present disclosure will be described.

In the present embodiment, the nodes 3 are assigned different priorities of communication. A transmission period of the header part in the communication signal CM transmitted from the node 3 having a higher priority is set to be longer than a transmission period of the header part in the communication signal CM transmitted from the node 3 having a lower priority.

Figure 6:
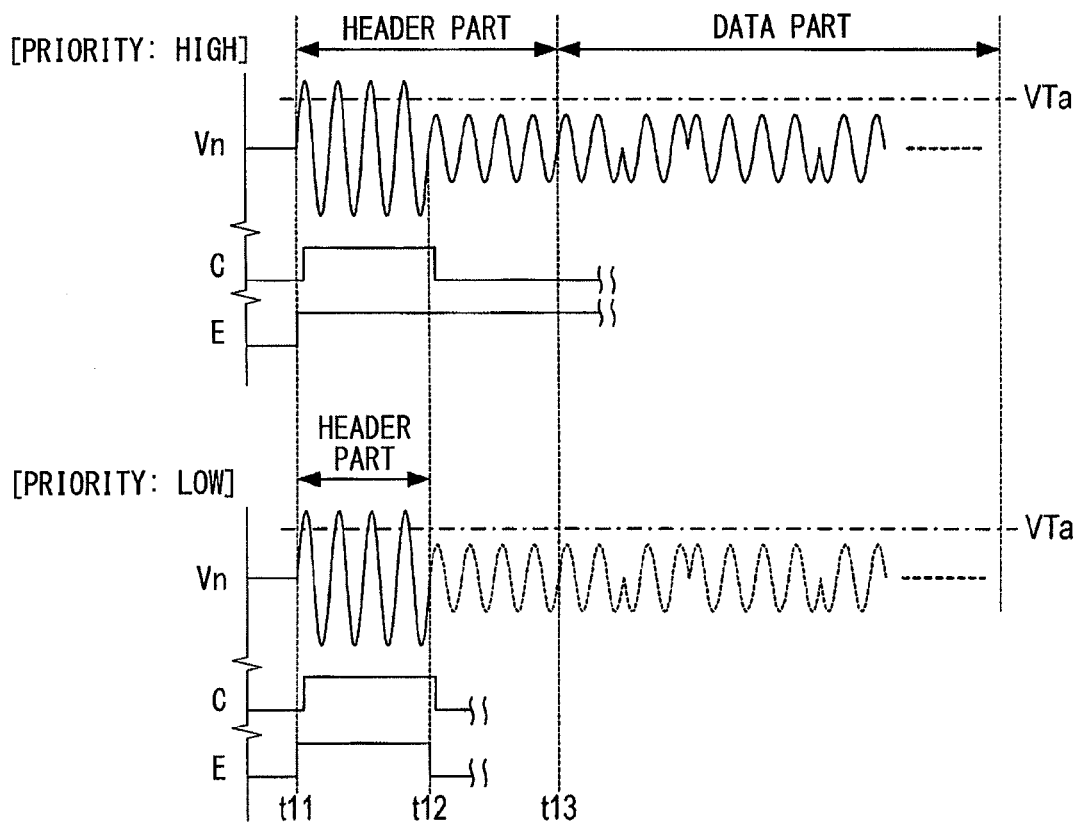
FIG. 6 is a diagram showing waveforms of a voltage across an inductor in a node side coupling portion in a communication system according to a second embodiment of the present disclosure.

The collision determination portion 345 determines the presence or absence of a collision just before the end of the transmission period of the header part corresponding to the priority assigned to the own node 3. When two nodes 3 having different priorities start to transmit the communication signals CM at the same time, the voltages Vn of the both nodes 3 exceeds the collision determination threshold value as shown in FIG. 6. Thus, the collision detection signal C transitions to the active level just after the start of the header part (time point t11).

When the node 3 having the low priority ends the transmission of the header part (time point t12), because the collision detection C remains the active level just before the time point t12, the node 3 having the low priority changes the transmission enabling signal E to the active level and stops the transmission of the communication signal CM.

At this time, the node 3 having the high priority continues the transmission of the header part. Because a collision on the transmission path 2 is eliminated, the voltage Vn across the inductor becomes less than the collision determination threshold value, and the collision detection signal C transitions to the non-active level.

Then, when the node 3 having the high priority ends the transmission of the header part (time point t13), because the collision detection signal C just before the time point t13 is at the non-active level, the node 3 having the high priority of transmits the data part.

In the node 3 having the low priority, the voltage Vn across the inductor detected after the transmission of the communication signal CM ends (time point t12) depends on the signal on the transmission path 2. Thus, the node 3 having the low priority can receive the communication signal CM even from a collision partner.

In the communication system 1 according to the present embodiment, when a collision occurs, the node 3 having the low priority stops the transmission and the node 3 having the highest priority continues the transmission. Thus, the communication efficiency can be improved.

In the present embodiment, the retransmission timer is not always necessary. Thus, the process relating to the retransmission timer (S140 and a part of S180) can be omitted.

(Third Embodiment)

Next, a communication system 1 according to a third embodiment of the present disclosure will be described.

Figure 7:
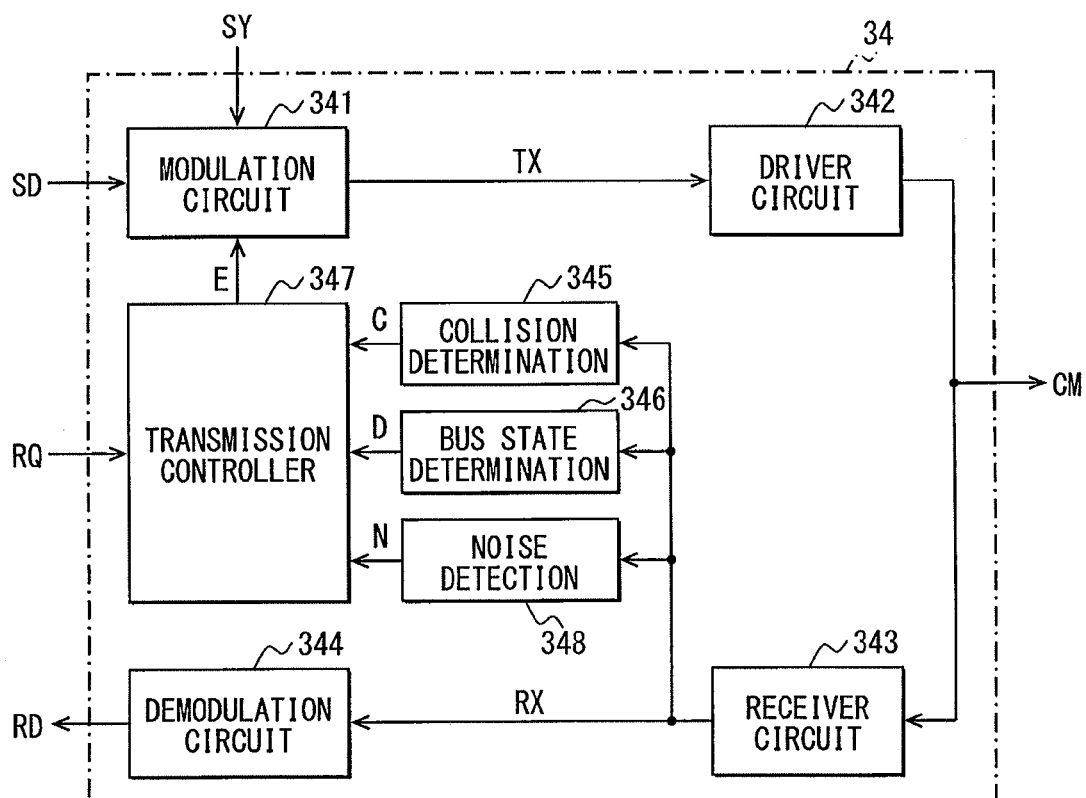
FIG. 7 is a block diagram showing a transceiver according to a third embodiment of the present disclosure.

As shown in FIG. 7, the transceiver 34 according to the present embodiment includes a noise detection portion 348. The noise detection portion 348 detects a level of a noise floor of the reception signal RX. The transmission controller 347 changes the length of the header part based on the detection result of the noise detection portion 348.

Specifically, the transmission controller 347 dynamically sets the length of the header part such that the transmission period of the header part increases with the amount of noise in environment (I.e., height of the level of the noise floor) based on the detection result of the noise detection portion 348.

The communication system 1 according to the present embodiment can appropriately set the length of the header part based on the noise environment. A state of noise may be detected not only using the detection result of the level of the nose floor but also using a measurement result of a bit error rate, for example.

(Other Embodiments)

Although the present disclosure has been fully described in connection with the exemplary embodiments thereof with reference to the accompanying drawings, it is to be noted that various changes and modifications will become apparent to those skilled in the art.

In the above-described embodiments, the power supplying node 3a uses the communication matching circuit 35. Instead of the communication matching circuit 35, the power supplying node 3a may use the common matching circuit 39 used in the power supplied node 3b. In the present case, the power supplying node 3a may include a filter that selectively allows passage of the signal of the communication frequency between the transceiver 34 and the common matching circuit 39.

In the above-described embodiments, the transceiver 34 transmits the communication signal CM by voltage drive. However, the transceiver 34 may transmits the communication signal CM by current drive. in the above-described embodiment, the PSK modulation is used as the modulation method of the communication signal CM. However, the modulation method of the communication signal CM may be another modulation method, such as a frequency shift keying (FSK) or a quadrature phase shift keying (QPSK), with which a frequency spectrum of a modulated signal does not widely broaden.

In the above-described embodiments, one of the nodes 3 is the power supplying node 3a that performs power supply. However, a power supplying device including the power supply signal generator 31 and the power supply matching circuit 32 may be separately provided and all the nodes 3 may be the power supplied nodes 3b.

What is claimed is:

1. A communication system comprising:
a transmission path;
a plurality of nodes coupled to the transmission path in a bus topology, the plurality of nodes communicating with each other via the transmission path using communication signals having a predetermined communication frequency; and
a power supplying portion supplying a power supply signal having a predetermined power supply frequency to the transmission path,
wherein each of the plurality of nodes includes a coupling portion, a synchronizing signal generation portion, a bus state determination portion, a transmission portion, a collision determination portion, and a transmission stopping portion,
wherein the coupling portion transmits and receives the power supply signal and a communication signal using electromagnetic induction in non-contact with the transmission path,
wherein the synchronizing signal generation portion generates a synchronizing signal that has the communication frequency and is synchronized with the power supply signal based on the power supply signal received via the coupling portion,
wherein the bus state determination portion determines whether the transmission path is in an idle state in which the communication signal does not exist on the transmission path based on a voltage level of a signal that has the communication frequency and is induced at the coupling portion,
wherein the transmission portion transmits the communication signal via the coupling portion when the bus state determination portion determines that the transmission path is in the idle state, the communication signal includes a header part and a data part, the header part includes the synchronizing signal without modulation, the data part includes a signal obtained by modulating the synchronizing signal with a transmission data to another node in the plurality of nodes,
wherein the collision determination portion determines whether a collision of the communication signals occurs on the transmission path based on the voltage level of the signal that has the communication frequency and is induced at the coupling portion, and
the transmission stopping portion stops transmission of the data part by the transmission portion when the collision determination portion determines that the collision occurs during transmission of the header part.

2. The communication system according to claim 1,
wherein the coupling portion includes a single resonance circuit that resonates at the power supply frequency, and
wherein the communication frequency is set such that a transmission efficiency of the coupling portion is greater than or equal to a predetermined lower limit.

3. The communication system according to claim 1,
wherein the plurality of nodes are assigned different priorities, and
wherein a transmission period of the header part transmitted from a node from the plurality of nodes having a higher priority is set to be longer than a transmission period of the header part transmitted from a node from the plurality of nodes having a lower priority.

4. The communication system according to claim 1, wherein each of the plurality of nodes includes a noise detection portion and a header length setting portion,
wherein the noise detection portion detects a generation state of noise on the transmission path, and
wherein the header length setting portion changes a length of a transmission period of the header part based on a detection result of the noise detection portion.

5. The communication system according to claim 1,
wherein the power supplying portion is included in one of the plurality of nodes, and
wherein the synchronizing signal generation portion in the node including the power supplying portion generates the synchronizing signal based on the power supply signal supplied from the power supplying portion.

* * * * *